US012748203B2

(12) United States Patent
Carlström

(10) Patent No.: US 12,748,203 B2
(45) Date of Patent: Sep. 29, 2026

(54) RADAR DETECTION MULTIPATH DETECTOR

(71) Applicant: Aptiv Technologies AG, Schaffhausen (CH)

(72) Inventor: Niclas Carlström, Gothenburg (SE)

(73) Assignee: Aptiv Technologies AG, Schaffhausen (CH)

( * ) Notice: Subject to any disclaimer, the term of this patent is extended or adjusted under 35 U.S.C. 154(b) by 269 days.

(21) Appl. No.: 18/511,181

(22) Filed: Nov. 16, 2023

(65) Prior Publication Data

US 2024/0159889 A1 May 16, 2024

(30) Foreign Application Priority Data

Nov. 16, 2022 (EP) .................................... 22207741

(51) Int. Cl.

*G01S 13/58* (2006.01)
*G01S 7/41* (2006.01)
*G01S 13/931* (2020.01)

(52) U.S. Cl.

CPC ............ *G01S 13/584* (2013.01); *G01S 7/415* (2013.01); *G01S 2013/9318* (2020.01); *G01S 2013/93185* (2020.01)

(58) Field of Classification Search

CPC ...... G01S 13/931; G01S 13/584; G01S 7/354; G01S 13/42; G01S 13/726; G01S 7/415; G01S 13/04

See application file for complete search history.

(56) References Cited

U.S. PATENT DOCUMENTS

| | | | | |
|---|---|---|---|---|
| 2020/0278435 | A1 * | 9/2020 | Wang .................... | G01S 13/931 |
| 2021/0104027 | A1 | 4/2021 | Longman et al. | |

FOREIGN PATENT DOCUMENTS

| | | | |
|---|---|---|---|
| EP | 3299841 | A1 | 3/2018 |
| WO | 2020176483 | A1 | 9/2020 |
| WO | 2021127702 | A1 | 6/2021 |

OTHER PUBLICATIONS

Extended European Search Report for 22207741.4, dated Apr. 21, 2023, 17 pages.

Nicolas Scheiner, "Seeing Around Street Corners: Non-Line-of-Sight Detection and Tracking In-the-Wild Using Doppler Radar," Mar. 31, 2020, Proceedings of the IEEE/CVF Conference on Computer Vision and Pattern Recognition (CVPR), 2020, pp. 2068-2077.

* cited by examiner

*Primary Examiner* — William Kelleher
*Assistant Examiner* — Juliana Cross
(74) *Attorney, Agent, or Firm* — Miller Johnson

(57) ABSTRACT

A computer-implemented method for identifying a ghost object observed by a radar sensor used to track objects includes receiving a reflected radar signal from a candidate object and identifying the candidate object as a ghost object in case a set of conditions is met. The method includes, if the candidate object is not a ghost object, identifying the candidate object as a real object.

10 Claims, 5 Drawing Sheets

RADAR DETECTION MULTIPATH DETECTOR

CROSS-REFERENCE TO RELATED APPLICATIONS

This application claims priority to EP App. No. 22 207 741 filed Nov. 16, 2022, the entire disclosure of which is incorporated by reference.

FIELD

The present invention relates to methods and systems for identifying objects observed by a radar sensor.

BACKGROUND

A radar signal transmitted by a radar sensor may be reflected by an object in an environment of the radar sensor and return to the radar sensor. The reflected radar signal received by the radar sensor may be indicative of a range, an angle, and a range rate (relative radial velocity) of the object. For example, in automotive applications, a radar sensor mounted on a vehicle may be used to monitor an environment of the vehicle. Based on the reflected radar signals, objects such as other vehicles, pedestrians and/or other obstacles may be identified. By continuously monitoring the environments using the radar sensor, objects in the environment of the vehicle may be tracked. The identification of objects in an environment of a vehicle is an essential pre-requisite for various tasks, such as in autonomously driving vehicles.

However, there is a possibility that a transmitted radar signal is reflected multiple times before being received by the radar sensor. This phenomenon is commonly referred to as a "multipath reflection" and can result in the mis-identification of an object, wherein a mis-identified object is commonly referred to as a "ghost object".

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

There is, therefore, a need to provide a method for identifying ghost objects observed by a radar sensor.

The novel approach provides a method to determine whether a reflected radar signal received by a radar sensor stems from a ghost object. This way, it becomes possible to mitigate the tracking of ghost objects.

One embodiment relates to a computer-implemented method for identifying a ghost object observed by a radar sensor used to track objects, the method comprising: receiving a reflected radar signal from a candidate object; and identifying the candidate object as a ghost object in case a set of conditions is met, otherwise identifying the candidate object as a real object.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

The present invention shall now be described in conjunction with specific embodiments. The specific embodiments serve to provide the skilled person with a better understanding but are not intended to in any way restrict the scope of the invention, which is defined by the appended claims. In particular, the embodiments described independently throughout the description can be combined to form further embodiments to the extent that they are not mutually exclusive.

A radar sensor may comprise transmit and receive antennas. A transmit antenna may transmit a radar signal and the transmitted radar signal may be reflected by a target. A receive antenna may receive the reflected radar signal. Alternatively, a radar sensor may comprise transducer antennas capable of switching between transmitting and receiving radar signals. A pulse-Doppler radar sensor, for example, may transmit a radar signal comprising a set of coherent pulses repeated at a steady pulse repetition frequency (PRF).

The one or more radar antennas may, for example, be part of a frequency modulated continuous wave radar (FMCW) radar sensor. A FMCW radar sensor may be used to measure a range (distance to a target) based on time differences between transmitted and reflected radar signals. The FMCW radar sensor may transmit a continuous radar signal with alternating frequencies. For example, The FMCW radar may generate a frequency ramp, commonly referred to as a chirp.

Figure 1A:
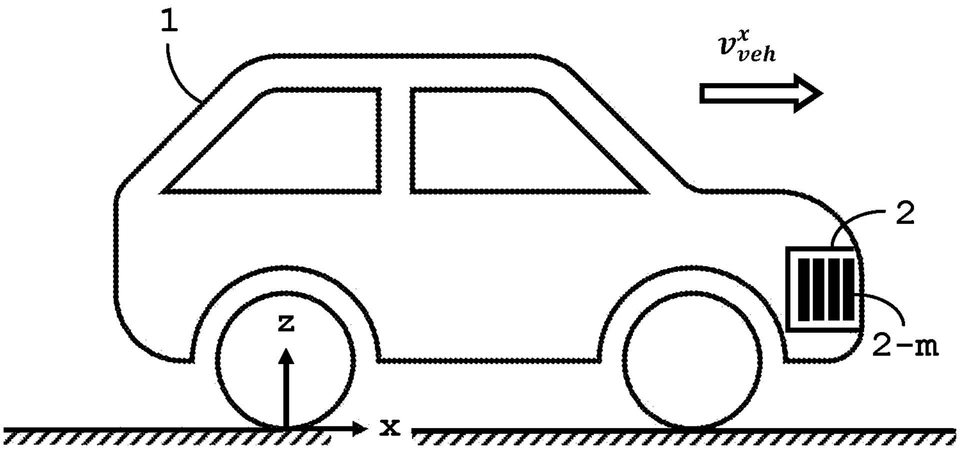
FIG. 1A shows a side view of a vehicle comprising a radar sensor in a front-right corner of a chassis of the vehicle.
Figure 1B:
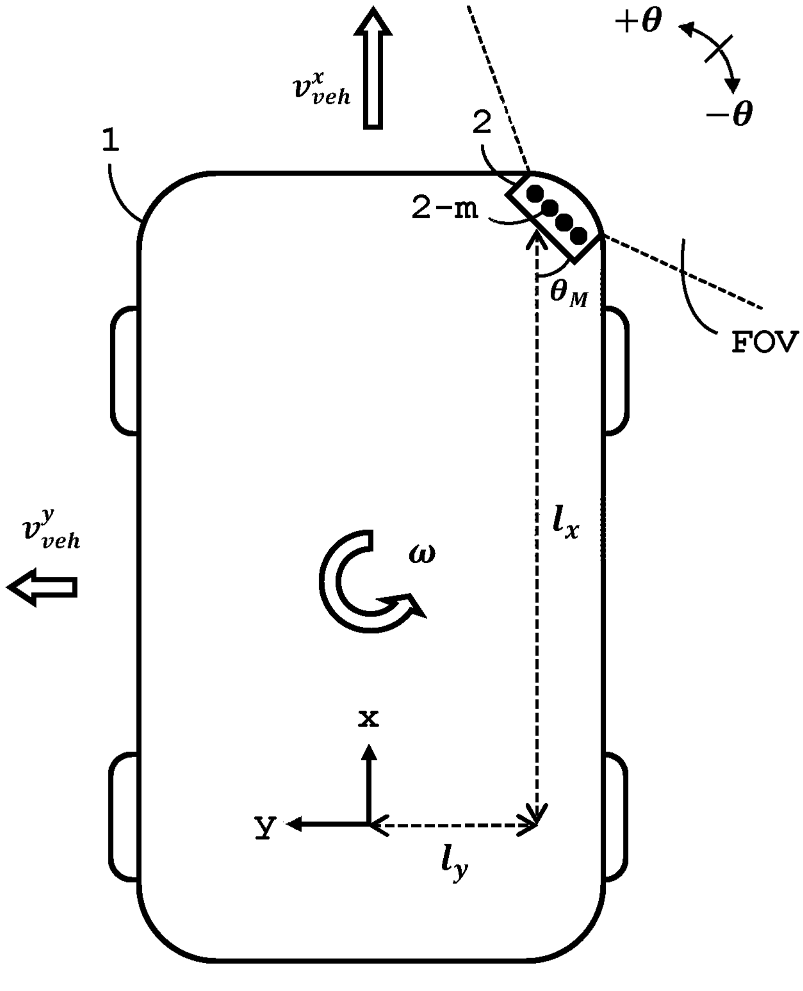
FIG. 1B shows a top view of a vehicle comprising a radar sensor in a front-right corner of a chassis of the vehicle.

FIGS. 1A and 1B show side vie and top view, respectively, of a vehicle 1 comprising a radar sensor 2 in a front-right (FR) corner of a chassis of the vehicle. In this example, the radar sensor 2 comprises four radar antennas (antenna elements) 2-*m* (m=1, . . . , 4) arranged in parallel (to the z-axis) along a first arraying direction (in the x-y-plane). Within the field-of-view (FOV) of the radar sensor 2, reflected radar signals may hit the radar antennas 2-*m* with different phases.

Here, the Cartesian coordinate system defined by the x, y and z-axes as shown in FIGS. 1A and 1B is usually referred to as the vehicle coordinate system (VCS). The origin of a two-dimensional VCS may be located at the center of the vehicle's rear axle, the x-axis may point along the forward direction and the y-axis may point to the left side of the vehicle. In a three-dimension version of the VCS, the origin may be located on the ground, below the midpoint of the rear axle, and the z-axis may point up from the ground so as to maintain the right-handed coordinate system.

As shown in FIGS. 1A and 1B, in a case where the radar sensor is mounted on a vehicle, the information on the ego-motion of the vehicle may comprise the longitudinal and lateral velocities of the vehicle, $$v_{veh}^{x}$$

and $$v_{veh}^{y},$$

respectively, and the yaw rate co of the vehicle. The mounting positions may comprise the longitudinal and lateral mounting positions, $l_x$ and $l_y$, respectively. The mounting angle of the one or more radar antennas on the vehicle may be denoted by $\theta_M$. The ego-motion of the vehicle may be determined based on measurements by the radar sensor or may be determined based on auxiliary measurement provided by a motion sensor such as, for example, an on-board odometry sensor, a GPS-based speedometer, or the like.

The reflected radar signal may be received by each of the one or more radar antennas. Each antenna measures the reflected radar signal and may use a specified sampling frequency. The resulting radar data may be processed to derive a range and range rate (Doppler) of an object off which the radar signal is reflected. An overview of common processing techniques for radar data is provided, for example, in chapter IV of Principles of Modern Radar: Basic Principles, Volume 1; Richards, M. A. and Scheer, J. A. and Scheer, J. and Holm, W. A.; Institution of Engineering and Technology; 2010.

Direction of arrival (DOA) estimation methods such as beam-forming fast Fourier transformation (beam-forming FFT) may be used to estimate the angle of incidence of the received electromagnetic signal reflected from an object. For example, for a radar sensor comprising a plurality of receive antennas arranged in parallel along a first arraying direction (i.e. an antenna array), the DOA may be measured in a plane spanned by the first arraying direction and an axis perpendicular to the antennas, e.g. the forward direction of the radar sensor (see also FIG. 1B). A polar coordinate system having a midpoint of the radar sensor at the origin may be defined such that the DOA is represented by the azimuth angle, in the following simply referred to as the angle θ. For example, for a radar sensor with a 160° FOV, the angle θ may take values between −80° and +80°. When more than one radar sensors are employed a common polar coordinate system may be formed.

It should be noted, however, that a radar sensor may comprise another plurality of receive antennas (i.e. another antenna array) having a second arraying direction which is, for example, perpendicular to the first arraying direction. Likewise, when more than one radar sensors are employed, the more than one radar sensor may have different arraying directions. This way, another angle (e.g. the polar angle in a spherical coordinate system of the radar sensor) may be determined.

More than one radar sensors may be mounted on the vehicle. For example, the vehicle may comprise one or more radar sensors mounted on one or more corners of a chassis of the vehicle. For example, the vehicle may comprise four radar sensors mounted on a rear-left, rear-right, front-right and front-left corner of the chassis. An environment traversed by the vehicle may comprise moving objects and stationary objects.

Figure 2A:
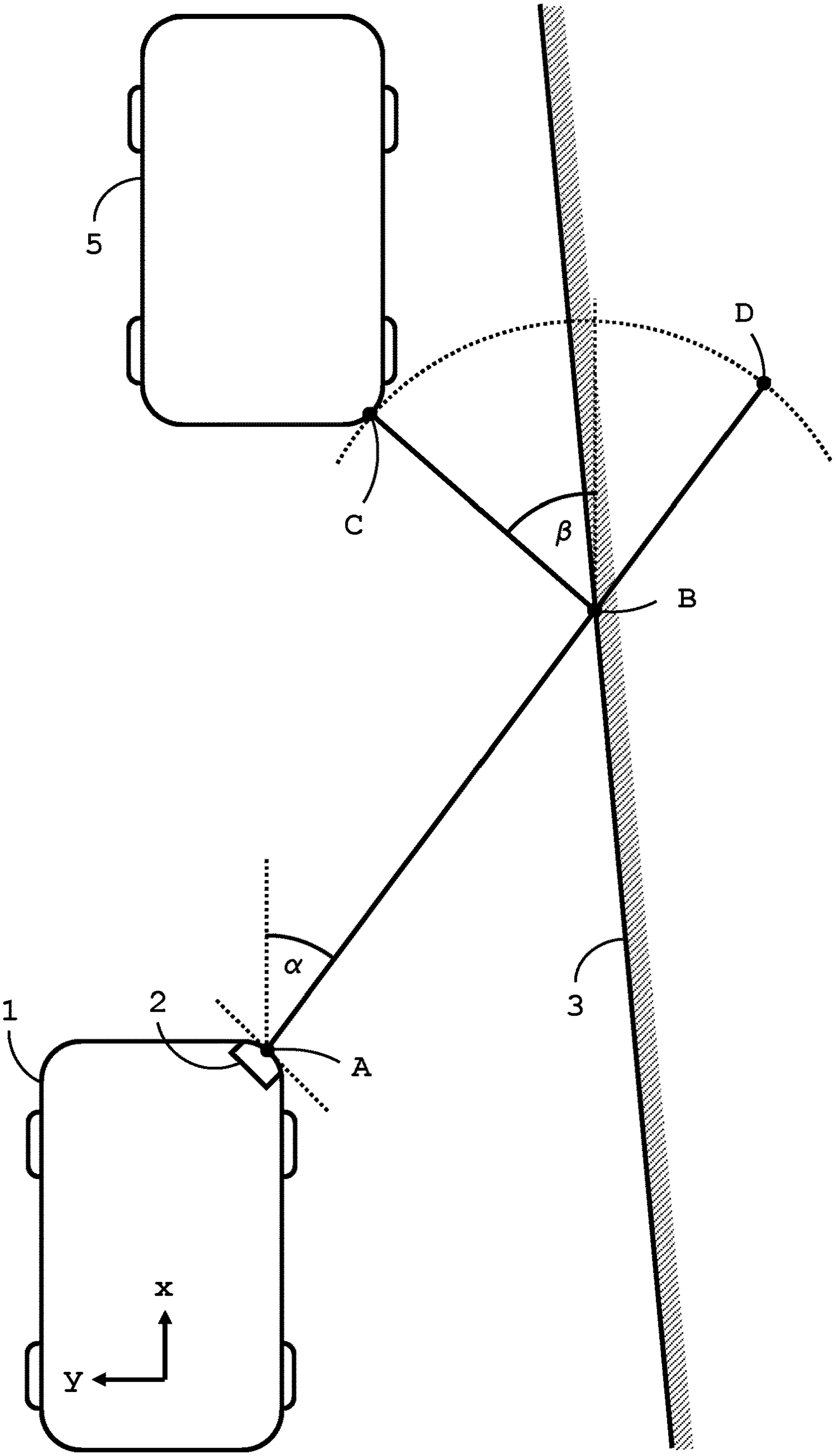
FIG. 2A shows a multipath reflection off objects in an environment of a vehicle.

FIG. 2A shows a multipath reflection off objects in an environment of a vehicle 1. Here, a radar signal is transmitted by the radar sensor 2 at an angle β, wherein the angle β is measured from the x-axis of the VCS of the vehicle 1. The radar signal propagates from a point A corresponding to the radar sensor 2 to a point B where it is reflected, at an angle α, wherein the angle α is measured from the x-axis of the VCS of the vehicle 1. In the present example, the point B is a point on an elongated obstacle 3. Then, the reflected radar signal propagates further from the point B to a point C where it is reflected back. In the present example, the point C is a point on a chassis of another vehicle 5. Then, the reflected radar signal propagates further from the point C to the point B where it is reflected again. Then, the reflected radar signal propagates further from the point B to the point A where it is received by the radar sensor 2. In other words, the radar signal propagates along the path A→B→C→B→A.

However, the reflected radar signal received by the radar sensor 2 is indicative of a range $\overline{AD}$ and the angle α corresponding to a distance and a direction of a point D as viewed from the radar sensor 2, wherein the angle α corresponds to the DOA of the received reflected radar wave. In the present example, however, no real object (vehicle, obstacle or the like) is present at the point D. Thus, in reference implementations, if the point D is identified as belonging to a real object off which the radar signal is assumed to have been reflected, the object may be misidentified as such. That is, as the distance $\overline{AB}+\overline{BC}$ is equal to the range $\overline{AD}$ and the point B and the point D result in the same DOA (angle α), the multipath reflection A→B→C→B→A appears like a reflection A→D→A.

Figure 2B:
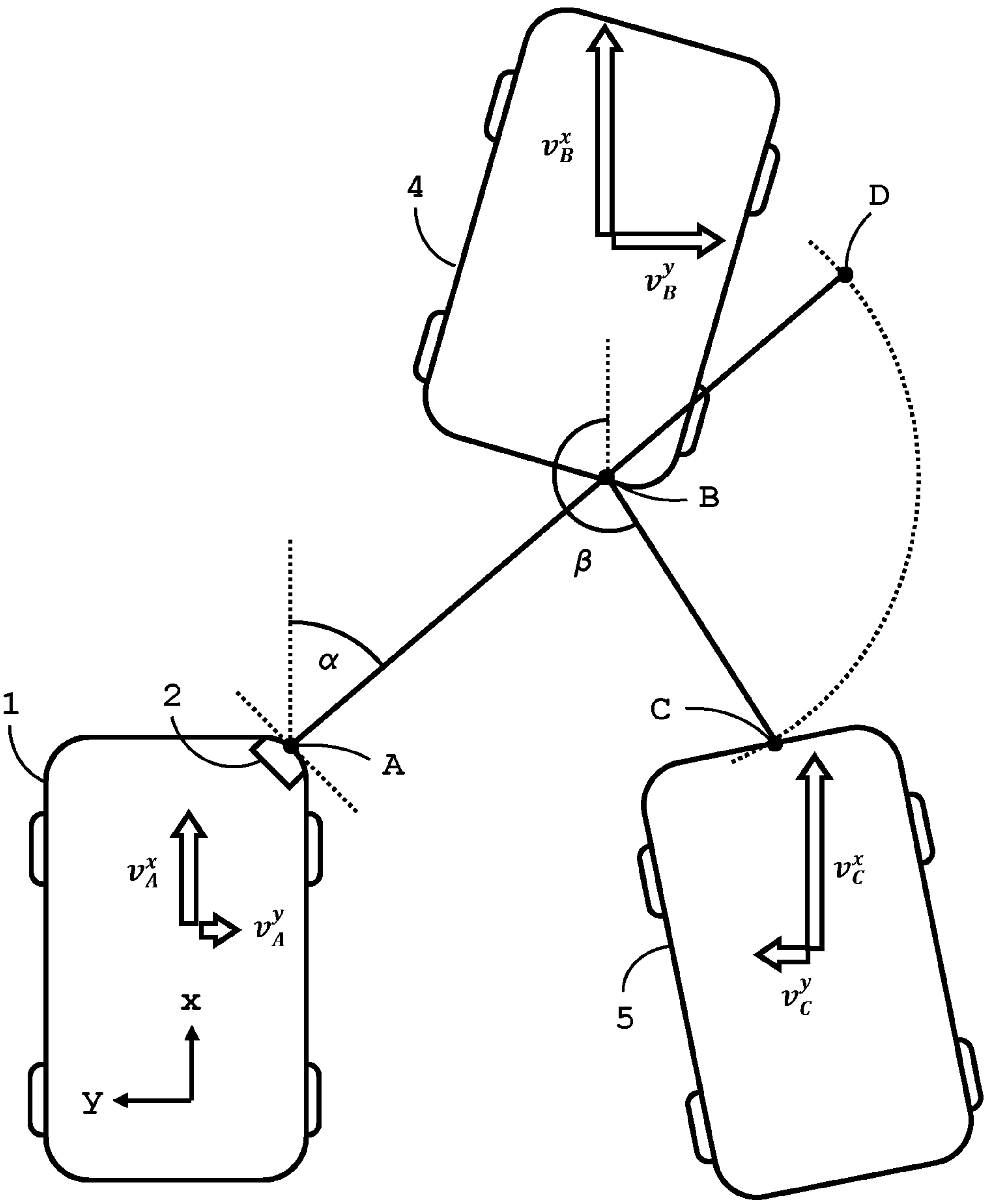
FIG. 2B shows a multipath reflection off objects in an environment of a vehicle.

FIG. 2B shows a multipath reflection off objects in an environment of a vehicle. Here, the radar signal propagates along the path A→B→C→B→A as described with reference to FIG. 2A with the difference being that the point B belongs to yet another vehicle 4. Furthermore, in the example of FIG. 2B, the velocities of the vehicle 1, the other vehicle 5 and the yet another vehicle 4 indicate by arrows indicating respective longitudinal and lateral velocities in the VCS of the vehicle 1. That is, $$v_{A}^{x}$$

and $$v_{A}^{y}$$

indicate respectively the longitudinal and lateral velocity of the vehicle 1 and hence of the point A, $$v_{B}^{x}$$

and $$v_{B}^{y}$$

indicate respectively the longitudinal and lateral velocity of the yet another vehicle 4 and hence of the point B, $$v_C^x$$

and $$v_C^y$$

indicate respectively the longitudinal and lateral velocity of the another vehicle 5 and hence of the point C.

Figure 3:
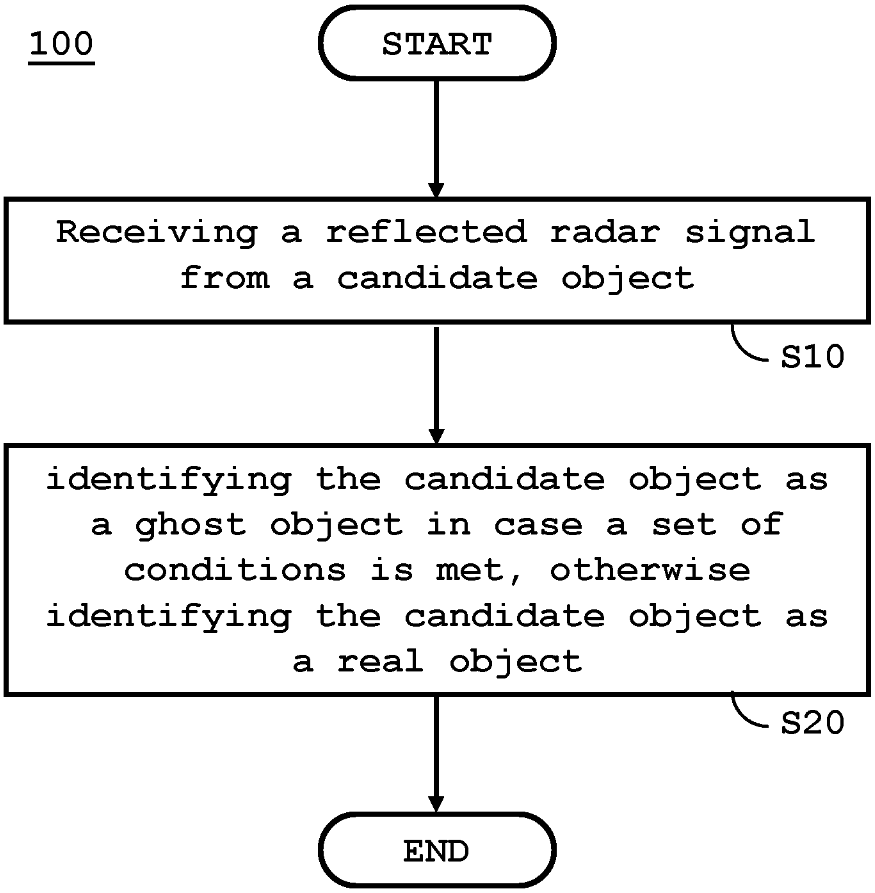
FIG. 3 shows a flowchart of a method for identifying a ghost object observed by a radar sensor used to track objects according to an embodiment of the present invention.

FIG. 3 shows a flowchart of a method 100 for identifying a ghost object observed by a radar sensor used to track objects according to an embodiment of the present invention. In the following, aspects of the method 100 are illustrated with reference to the examples of FIGS. 2A and 2B. In the example of FIG. 2A, the tracked objects comprise the elongated obstacle 3 and the other vehicle 5. In the example of FIG. 2B, the tracked objects comprise the other vehicle 5 and the yet other vehicle 4.

In step s20, the candidate object is identified as a ghost object in case a set of conditions is met, otherwise the candidate object is identified as a real object. In the examples of FIGS. 2A and 2B, the candidate object corresponds to a potential object located at point D. Hence, it is determined, based on the received radar signal which is indicative of a range $\overline{AD}$ and angle α, whether or not there is a real object at the point D.

In step s20, the candidate object is identified as a ghost object in case a set of conditions is met, otherwise the candidate object is identified as a real object. In the examples of FIGS. 2A and 2B, the candidate object corresponds to a potential object located at point D. Hence, it is determined, based on the received radar signal which is indicative of a range (AD)— and angle α, whether or not there is a real object at the point D.

The method 100 may further comprise tracking the candidate object when it is identified as a real object. This way, the candidate object may become one of the tracked objects. In other words, the tracked objects may be updated to further include the candidate object. A subsequent iteration of the method 100 may take the updated tracked objects into account, wherein a subsequent object is the subject of steps S10 and S20. This way, the subsequent iteration of the method 100 may be able to consider multipath reflections with one or more reflections being caused by the candidate object identified as a real object in a preceding iteration of the method 100.

Information on the tracked objects may be stored in a database and the information may comprise positions and velocities of the tracked objects in a coordinate system of the radar sensor. The coordinate system of the radar sensor may, for example, be the VCS of a vehicle comprising the radar sensor. The position of a tracked object may be inferred from the range and angle measured by the radar sensor. The velocity of a tracked object may be inferred from the range rate (Doppler) measured by the radar sensor. The information may further include dimensions (sizes), orientations and types (classifications) of the tracked objects.

The information stored in the database may be updated based on measurements by the radar sensor. In other words, the information on the tracked objects may be continuously updated. For example, the trajectory of each of the tracked objects may be monitored, wherein the trajectory of each of the tracked objects indicates the position and velocity of the corresponding tracked object as a function of time.

Even if information of a tracked object is not updated during a time period, the tracked object may remain in the database and be used in determining whether or not the candidate object is a ghost object. For example, information of a tracked object may not be updated during the time period when there is a sporadic drop in detection caused, for example, by noise, jitter or a temporary occlusion of the tracked object at least in the electromagnetic spectrum of the radar signal. Extrapolation methods may be used to extrapolate information of the tracked object during the time period using earlier information from prior to the time period. This way, the method 100 may be more robust against sporadic drops in detection.

The set of conditions may comprise a first condition which is met when a first object of the tracked objects lies on a path between the radar sensor and the candidate object. In the examples of FIGS. 2A and 2B, the first object corresponds to a tracked object located at point B, i.e. the elongated obstacle 3 or the yet another vehicle 4. Hence, it is determined, that the first condition is met since the point B lies on a path (straight line) between the point A and the point D. That is, the points B and D lie at the same angle α and the distance $\overline{AB}$ is less than the range $\overline{AD}$.

The set of conditions may further comprise a second condition which is met when the distance from a second object of the tracked objects to the first object is equal to the distance from the candidate object to the first object. In the examples of FIGS. 2A and 2B, the first object corresponds to a tracked object located at point C, i.e. the other vehicle 5. Hence, it is determined, that the second condition is met since the distance $\overline{BC}$ is equal to the distance $\overline{BD}$, as indicate by the partial circle around point B in FIGS. 2A and 2B.

The second condition may be tested for all tracked objects by first computing the test distance $\delta=\overline{AD}-\overline{AB}$ and comparing it to distances from point B to the tracked objects. If a tracked object is found which lies at a distant equal to the testing distance δ from the point B, the second condition is satisfied.

The set of conditions may further comprise a third condition which is met when a difference between the measured range rate of the candidate object and a predicted range rate of the candidate object is below a threshold. The predicted range rate may be computed based on a first relative velocity between the radar sensor and the first object and a second relative velocity between the first object and the second object, assuming that the candidate object is a ghost object. In the example of FIG. 2B, the predicted range rate of the candidate object at the point D may be computed under the assumption of a multipath reflection A→B→C→B→A. The predicted range rate may be computed as:

$$\dot{r}_{predicted} = \cos(\alpha)\cdot(v_B^x - v_A^x) + \sin(\alpha)\cdot(v_B^y - v_A^y) + \cos(\beta)\cdot(v_C^x - v_B^x) + \sin(\beta)\cdot(v_C^y - v_C^y)$$

The predicted range rate $\dot{r}_{predicted}$ of the candidate object assuming multipath reflections may be compared to the measured range rate $\dot{r}_{measured}$ of the candidate object based on the threshold Δ:

$$|\dot{r}_{predicted} - \dot{r}_{measured}| < \Delta$$

If the above inequality is satisfied, the third condition is met, and the candidate object may be identified as ghost object. The above inequality may be modified such that relative difference (e.g. in percent) between the predicted range rate $\dot{r}_{predicted}$ and the measured range rate $\dot{r}_{measured}$ is compared to the threshold Δ. The above inequality may be modified by not computing an absolute value of the difference and comparing the difference to a threshold corresponding to an interval of values.

The threshold may be a predetermined value. The predetermined value may be set in advance of performing the step S10. Alternatively, the threshold may be based on one or more of a velocity of the radar sensor, a velocity of the first object and a velocity of the second object. In other words, the threshold may be an adaptive threshold that depends on the ego-motion of the radar sensor velocities of two or more of the tracked objects.

In an embodiment in which the radar sensor is mounted on a vehicle, the method 100 may further comprise executing, when the candidate object (D) is identified as a real object, a predetermined operation of the vehicle based on the range and range rate of the candidate object. The predetermined operation may comprise adaptive headlight control, automatic steering and/or automatic emergency braking. This way, the execution of the predetermined operation may be avoided in case the candidate object corresponds to a ghost object and the execution of the predetermined operation may only be performed based on correctly identified objects.

Figure 4:
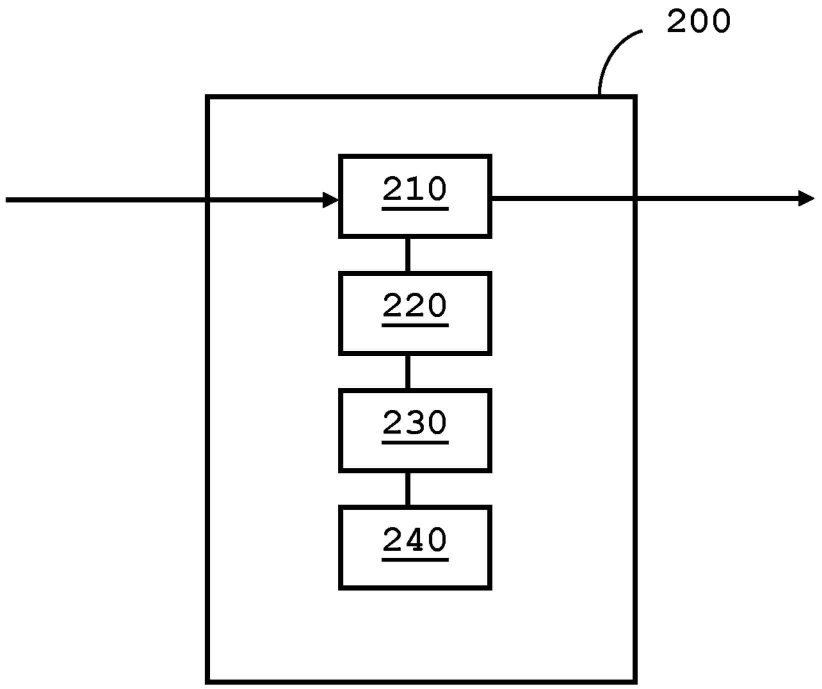
FIG. 4 shows a schematic illustration of a hardware structure of a data processing apparatus according to an embodiment of the present invention.

FIG. 4 is a schematic illustration of a hardware structure of a data processing apparatus comprising means for carrying out the steps of the methods of any of the embodiments disclosed above.

The data processing apparatus 200 has an interface module 210 providing means for transmitting and receiving information. The data processing apparatus 200 has also a processor 220 (e.g. a CPU) for controlling the data processing apparatus 200 and for, for instance, process executing the steps of the methods of any of the embodiments disclosed above. It also has a working memory 230 (e.g. a random-access memory) and an instruction storage 240 storing a computer program having computer-readable instructions which, when executed by the processor 220, cause the processor 220 to perform the methods of any of the embodiments disclosed above.

The instruction storage 240 may include a ROM (e.g. in the form of an electrically erasable programmable read-only memory (EEPROM) or flash memory) which is pre-loaded with the computer-readable instructions. Alternatively, the instruction storage 240 may include a RAM or similar type of memory, and the computer-readable instructions can be input thereto from a computer program product, such as a computer-readable storage medium such as a CD-ROM, etc.

In the foregoing description, aspects are described with reference to several embodiments. Accordingly, the specification should be regarded as illustrative, rather than restrictive. Similarly, the figures illustrated in the drawings, which highlight the functionality and advantages of the embodiments, are presented for example purposes only. The architecture of the embodiments is sufficiently flexible and configurable, such that it may be utilized in ways other than those shown in the accompanying figures.

Software embodiments presented herein may be provided as a computer program, or software, such as one or more programs having instructions or sequences of instructions, included or stored in an article of manufacture such as a machine-accessible or machine-readable medium, an instruction store, or computer-readable storage device, each of which can be non-transitory, in one example embodiment. The program or instructions on the non-transitory machine-accessible medium, machine-readable medium, instruction store, or computer-readable storage device, may be used to program a computer system or other electronic device. The machine- or computer-readable medium, instruction store, and storage device may include, but are not limited to, floppy diskettes, optical disks, and magneto-optical disks or other types of media/machine-readable medium/instruction store/storage device suitable for storing or transmitting electronic instructions. The techniques described herein are not limited to any particular software configuration. They may find applicability in any computing or processing environment. The terms "computer-readable", "machine-accessible medium", "machine-readable medium", "instruction store", and "computer-readable storage device" used herein shall include any medium that is capable of storing, encoding, or transmitting instructions or a sequence of instructions for execution by the machine, computer, or computer processor and that causes the machine/computer/computer processor to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media, instruction store(s), or storage device(s), having instructions stored thereon or therein which can be used to control, or cause, a computer or computer processor to perform any of the procedures of the example embodiments described herein. The storage medium/instruction store/storage device may include, by example and without limitation, an optical disc, a ROM, a RAM, an EPROM, an EEPROM, a DRAM, a VRAM, a flash memory, a flash card, a magnetic card, an optical card, nano systems, a molecular memory integrated circuit, a RAID, remote data storage/archive/warehousing, and/or any other type of device suitable for storing instructions and/or data.

Stored on any one of the computer-readable medium or media, instruction store(s), or storage device(s), some implementations include software for controlling both the hardware of the system and for enabling the system or microprocessor to interact with a human user or other mechanism utilizing the results of the embodiments described herein. Such software may include without limitation device drivers, operating systems, and user applications. Ultimately, such computer-readable media or storage device(s) further include software for performing example aspects, as described above.

Included in the programming and/or software of the system are software modules for implementing the procedures described herein. In some example embodiments herein, a module includes software, although in other example embodiments herein, a module includes hardware, or a combination of hardware and software.

While various embodiments of the present disclosure have been described above, it should be understood that they have been presented by way of example, and not limitation. It will be apparent to persons skilled in the relevant art(s)

that various changes in form and detail can be made therein. Thus, the above-described example embodiments are not limiting.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" means a grouping of one or more elements. The elements of a set do not necessarily need to have anything in common. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for identifying a ghost object observed by a radar sensor mounted on a vehicle and used to track a set of objects, the method comprising:

receiving a reflected radar signal from a candidate object, wherein the reflected radar signal is indicative of a measured range rate of the candidate object; and in response to a set of conditions being met, identifying the candidate object as the ghost object, and identifying the candidate object as a real object otherwise, wherein: the set of conditions includes:

a first condition that is met when a first object of the set of objects lies on a path between the radar sensor and the candidate object, a second condition that is met when a distance from a second object of the set of objects to the first object is equal to a distance from the candidate object to the first object, and a third condition that is met when a difference between the measured range rate of the candidate object and a predicted range rate of the candidate object is below a threshold, and the predicted range rate is computed based on (i) a first relative velocity between the radar sensor and the first object and (ii) a second relative velocity between the first object and the second object.

2. The method of claim 1 wherein the threshold is based on at least one of a velocity of the radar sensor, a velocity of the first object, or a velocity of the second object.

3. The method of claim 2 wherein the set of objects is located in a field-of-view of the radar sensor.

4. The method of claim 1 wherein the threshold is a predetermined value.

5. The method of claim 1 further comprising:

storing information on the set of objects in a database; and the information includes positions and velocities of the set of objects in a coordinate system of the radar sensor.

6. The method of claim 5 further comprising updating the information stored in the database based on measurements by the radar sensor.

7. The method of claim 1 further comprising, in response to the candidate object being identified as a real object, tracking the candidate object.

8. The method of claim 7 further comprising:

in response to the candidate object being identified as a real object, executing a predetermined operation of a vehicle based on a range and a range rate of the candidate object, wherein the predetermined operation includes at least one of adaptive headlight control, automatic steering, or automatic emergency braking.

9. An apparatus comprising:

a computer-readable medium storing instructions; and at least one processor configured to execute the instructions, wherein the instructions include:

receiving information on a reflected radar signal from a candidate object sensed by a radar sensor, wherein the reflected radar signal is indicative of a measured range rate of the candidate object, and in response to a set of conditions being met, identifying the candidate object as a ghost object, and otherwise identifying the candidate object as a real object, wherein:

the set of conditions includes:

a first condition that is met when a first object of a set of objects that is being tracked by the radar sensor lies on a path between the radar sensor and the candidate object, a second condition that is met when a distance from a second object of the set of objects to the first object is equal to a distance from the candidate object to the first object, and a third condition that is met when a difference between the measured range rate of the candidate object and a predicted range rate of the candidate object is below a threshold, and the predicted range rate is computed based on (i) a first relative velocity between the radar sensor and the first object and (ii) a second relative velocity between the first object and the second object.

10. A vehicle comprising:

the apparatus of claim 9; and the radar sensor.

* * * * *